(12) United States Patent
Matsumoto

(10) Patent No.: US 6,299,453 B2
(45) Date of Patent: Oct. 9, 2001

(54) ROTARY CONNECTOR HAVING ROTOR HOUSING THAT CAN BE LOCKED TO STATOR HOUSING

(75) Inventor: Tsuyoshi Matsumoto, Tokyo (JP)

(73) Assignee: Niles Parts Co., Ltd., Tokyo (JP)

( * ) Notice: Subject to any disclaimer, the term of this patent is extended or adjusted under 35 U.S.C. 154(b) by 0 days.

(21) Appl. No.: 09/725,061

(22) Filed: Nov. 29, 2000

(30) Foreign Application Priority Data

Dec. 13, 1999 (JP) .................................................. 11-353156

(51) Int. Cl.[7] .................................................. H01R 39/00
(52) U.S. Cl. .............................................. 439/15; 439/164
(58) Field of Search ....................................... 439/15, 164

(56) References Cited

U.S. PATENT DOCUMENTS

| 4,966,334 | * | 10/1990 | Bannai | 439/15 |
| 5,429,517 | * | 7/1995 | Bolen | 439/15 |
| 5,630,723 | * | 5/1997 | Kawamoto | 439/15 |
| 5,752,843 | * | 5/1998 | Kawamoto et al. | 439/15 |

FOREIGN PATENT DOCUMENTS 1-83287    6/1989  (JP) .

* cited by examiner

*Primary Examiner*—Tho D. Ta
(74) *Attorney, Agent, or Firm*—Ronald P. Kananen; Rader, Fishman & Grauer

(57) ABSTRACT

A rotary connector (1) is provided having a stator housing (2) provided on a body of an automobile, a rotor housing (3) rotatably assembled to the stator housing (2) and coupled to a steering wheel (11), and a flat cable (5) accommodated in a space defined between the rotor housing (3) and the stator housing (2). The rotary connector (1) includes a rotor (8) having projections (8a). The stator housing (2) is formed with engagement portions (2a). The projections (8a) engage the engagement portions (2a) to prevent the rotor housing (3) from rotating. With this construction, the rotary connector can be rotatably locked during assembly even if a turn signal switch is not to be assembled under the steering wheel.

11 Claims, 4 Drawing Sheets

ROTARY CONNECTOR HAVING ROTOR HOUSING THAT CAN BE LOCKED TO STATOR HOUSING

BACKGROUND OF THE INVENTION

1. Field of the Invention

The present invention relates to a rotary connector for electrically connecting the body and the steering wheel of an automobile, and more particularly to a rotary connector having a rotor housing that can be locked to a stator housing.

2. Description of the Related Art

A conventional rotary connector is disclosed, for example, in Japanese Utility Model Preliminary Publication (KOKAI) No. 1-83287. This conventional rotary connector is provided with a fastening means for fixing a rotor housing, the fastening means engaging a cancel cam sleeve of a turn signal switch such that the fastening means is movable in axial directions of the cancel cam.

When the steering wheel of a vehicle is rotated, the rotary connector mounted on the vehicle is also allowed to rotate through approximately two rotations in each of a clockwise direction and a counterclockwise direction, from a neutral position of the steering wheel at which the vehicle runs straight.

If this rotary connector is assembled to the vehicle at an off-neutral position by mistake, the steering wheel cannot be rotated through two rotations either clockwise or counterclockwise. Forcibly rotating the steering wheel causes the cutting off of the flat cable assembled inside the rotary connector. In order to prevent such an accident, the prior art rotary connectors have a variety of fastening means.

The fastening means disclosed in the aforementioned prior art document is constructed such that when a rotary connector is disposed on the turn signal switch and the steering wheel has not been assembled on the rotary connector, a projection of the rotary connector moves into a cutout formed in a cancel cam of the turn signal switch to prevent rotation of the rotary connector.

When the steering wheel has been assembled on the rotary connector, the cancel cam is pressed against the lower surface of the steering wheel, so that the projection moves out of the cutout to allow the cancel cam to rotate.

The prior art rotary connector and turn signal switch are manufactured at separate plants and delivered separately to a final assembly plant. The rotary connector is assembled on the turn signal switch immediately before the steering wheel is assembled on the rotary connector.

However, the aforementioned prior art rotary connector suffers from the problem that after the turn signal switch has been disengaged from the rotary connector, the projection is out of the cutout and no longer performs a locking function. Thus, the aforementioned prior art rotary connector does not have a locking function if the turn signal switch is not to be assembled to the underside of the rotary connector. Accordingly, the prior art connector cannot be applied to a turn signal switch of a cluster switch type in which the turn signal switch is located beside an instrument panel.

Another type of locking means for a rotary connector is one in which a locking pin is inserted into both the rotor housing and the stator housing to prevent the rotor housing from rotating. With this type of locking means, the locking pin is pulled out of the rotary connector and put aside once the rotary connector has been assembled to the vehicle. Thus, it is uneconomical.

When the rotary connector is disengaged from the steering wheel for the purposes of checking and repairing the steering wheel, the rotor housing cannot be locked since the locking pin has been thrown away and the rotary connector no longer has the locking pin accordingly. If the rotor housing cannot be locked at a predetermined rotational position, the steering wheel may not be assembled properly.

As mentioned above, the rotary connector assembled in the wrong way is unable to rotate through two complete rotations either clockwise or counterclockwise. Attempting to forcibly rotate the steering wheel will cause the cutting off of the flat cable. The cutting of the flat cable leads to a drawback that an air bag, a horn, and the like provided on the steering wheel cannot operate properly.

SUMMARY OF THE INVENTION

An object of the present invention is to solve the above-described problems of the prior art, and to provide a rotary connector that can be locked even if the turn signal is not to be assembled under the steering wheel.

The present invention provides a rotary connector having a stator housing provided on a body of an automobile, a rotor housing that is rotatably assembled to the stator housing and is coupled to a steering wheel, and a flat cable that is accommodated in a space defined between the rotor housing and the stator housing. The rotary connector comprises a rotor having a projection, and the stator housing is formed with an engagement portion. The projection engages the engagement portion to prevent the rotor housing from rotating.

The rotor comprises a cylinder inserted into a hollow shaft cylinder of the rotor housing. The projection is formed on a circumference of the cylinder. A pressing surface is formed on the rotor that presses a lower surface of the steering wheel when the steering wheel is assembled to the rotary connector.

The projection of the rotor is one of a plurality of projections that project from a lower portion of the cylinder. The engagement portion of the stator housing is a projection that projects from a bottom surface of the stator housing.

The rotor is assembled to an attachment that couples the stator housing and the rotor housing together such that the rotor housing is rotatable relative to the stator housing. The attachment supports a spring that urges the rotor. The spring has an upper end in pressure contact with the projections and a lower end received between an annular groove formed in the attachment and a projection formed on an inner side of the annular groove.

The rotor and annular groove are formed such that when the steering wheel has been assembled on the rotary connect or and the rotor is pushed down by the steering wheel, the projections of the rotor lower into the annular groove. The attachment has vertical grooves into which the projections enter such that the projections are vertically movable in the vertical grooves.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
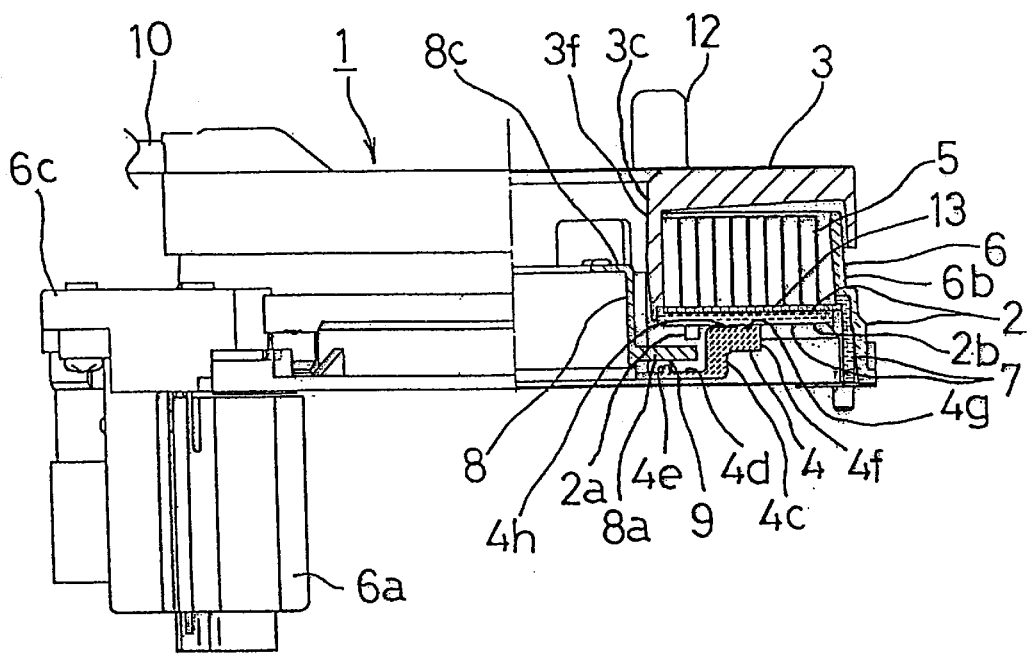
FIG. 1 is a partial cross-sectional side view of an embodiment of the invention, illustrating a steering wheel mounted to the rotary connector.

A rotary connector 1 according to a preferred embodiment of the present invention will now be described in detail with reference to FIGS. 1 to 5 of the drawings.

The rotary connector 1 electrically connects between a steering wheel 11 and a body of an automobile. The rotary connector 1 includes: a stator housing 2 mounted on a combination switch (not shown) that is fixedly mounted to a steering column (not shown); a rotor housing 3 that is fastened to the underside of the steering wheel 11 and rotates together with the steering wheel 11; an attachment 4 on which the rotor housing 3 is rotatably supported; a flat cable 5 accommodated in a space defined between the stator housing 2 and the rotor housing 3, the flat cable forming, for example, a spiral; a rotor 8 assembled between the stator housing 2 and the attachment 4; and a spring 9 that urges the rotor 8 upwardly.

The stator housing 2 is a stationary structure that is fixed by means of, for example, screws onto a base (not shown) of the combination switch. The stator housing 2 has engagement portions 2a formed on its bottom surface, the engagement portions 2a being engaged with later-described projections 8a of the rotor 8. The stator housing 2 includes a side housing 6 and a bottom housing 7, which are assembled to each other. In more detail, the side housing 6 has a fitting hole (not shown), and the bottom housing 7 has a fitting claw (not shown). The side housing 6 and the bottom housing 7 are assembled together with the fitting claw fitted into the fitting hole.

The side housing 6 and bottom housing 7 may be formed in one piece construction as the stator housing 2. The engagement portions 2a may be in the form of a projection, a recess, or any shape, provided that the engagement portions 2a can engage generally rod-shaped projections 8a.

As shown in FIG. 1, the bottom housing 7 supports an end of the flat cable 5 and has a guide (not shown) that guides the flat cable 5 in the space defined between the stator housing and the rotor housing 3. The bottom housing 7 has a slide sheet 13 placed on the bottom of the space. The side housing 6 has a connector 6a disposed below the guide.

The connector 6a has terminals (not shown) which are connected via the flat cable 5 to a wire harness 10 disposed on the rotor housing 3. The slide sheet 13 is a flat ring formed of oleoresin and allows the flat cable 5 to smoothly slide, thereby reducing the noise when the flat cable 5 slides on the bottom floor of the space.

Figure 5:
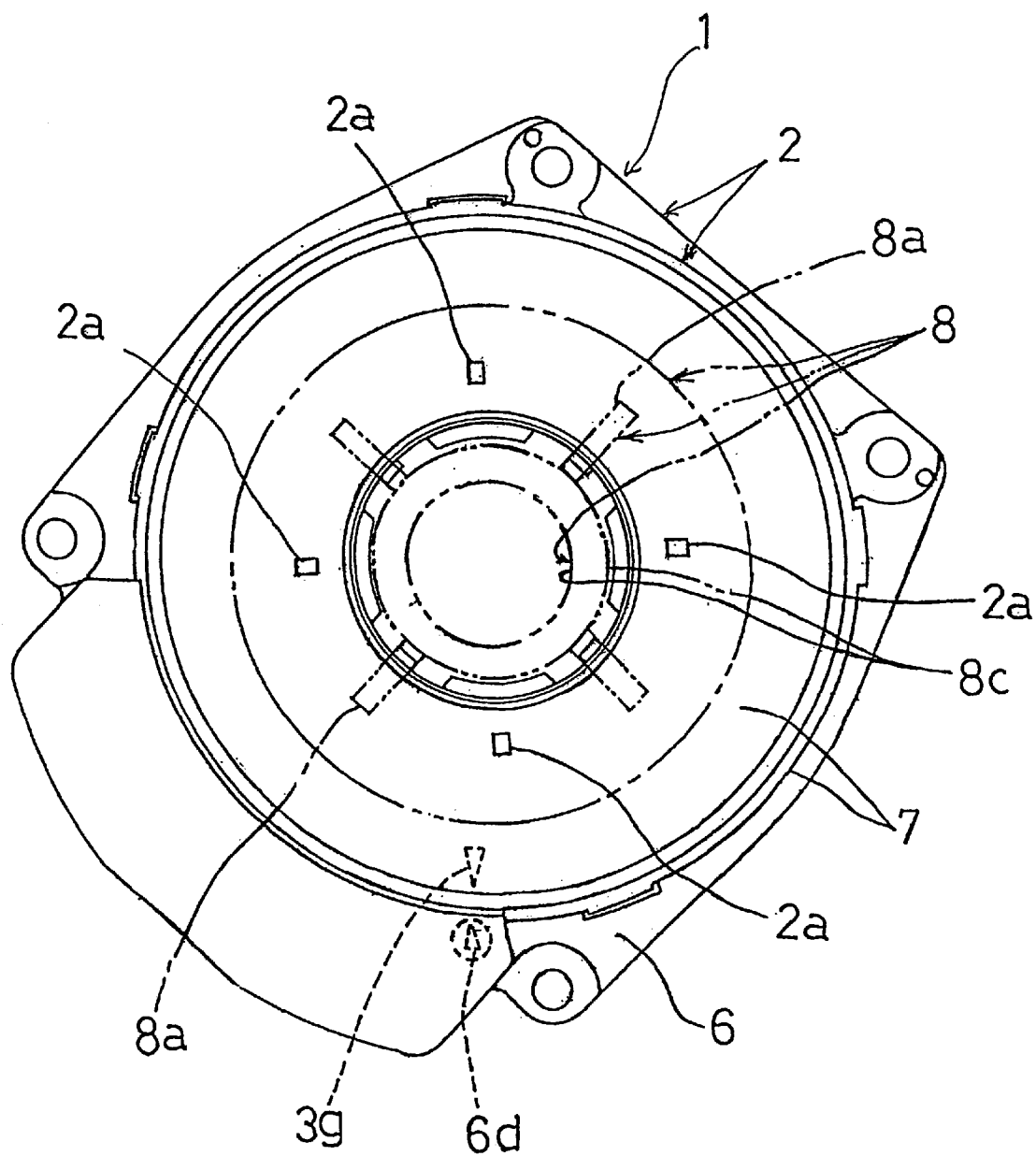
FIG. 5 illustrates the embodiment of the invention and is a bottom view of the engagement portions formed on the bottom surface of the stator housing.

The side housing 6 includes a generally ring-shaped cylinder 6b and a frame 6c that is formed to surround the lower portion of the cylinder 6b. The cylinder 6b and frame 6a are formed in one piece construction. The frame 6c is formed with the connector 6a thereon, and a threaded hole therein through which the rotary connector 1 is screwed into the base of the combination switch. As shown in FIG. 5, the side housing 6 and the rotor housing 3 have a mark 3g and a mark 6d, respectively, formed thereon, such that when the marks 3g and 6d face each other, they indicate that the rotary connector is at the neutral position of the wound flat cable.

With the coupling pin 12 engaging the lower surface of the steering wheel 11, the rotor housing 3 rotatably fits to the stator housing 2 and rotates together with the steering wheel 11. The rotor housing 3 has claws 3d formed in its inner circumferential surface 3c, the claws 3d engaging fitting portions 4a provided in the attachment 4. The rotor housing 3 also has a stepped portion (not shown) that abuts upright circumferential walls 4b of the attachment 4.

Figure 3:
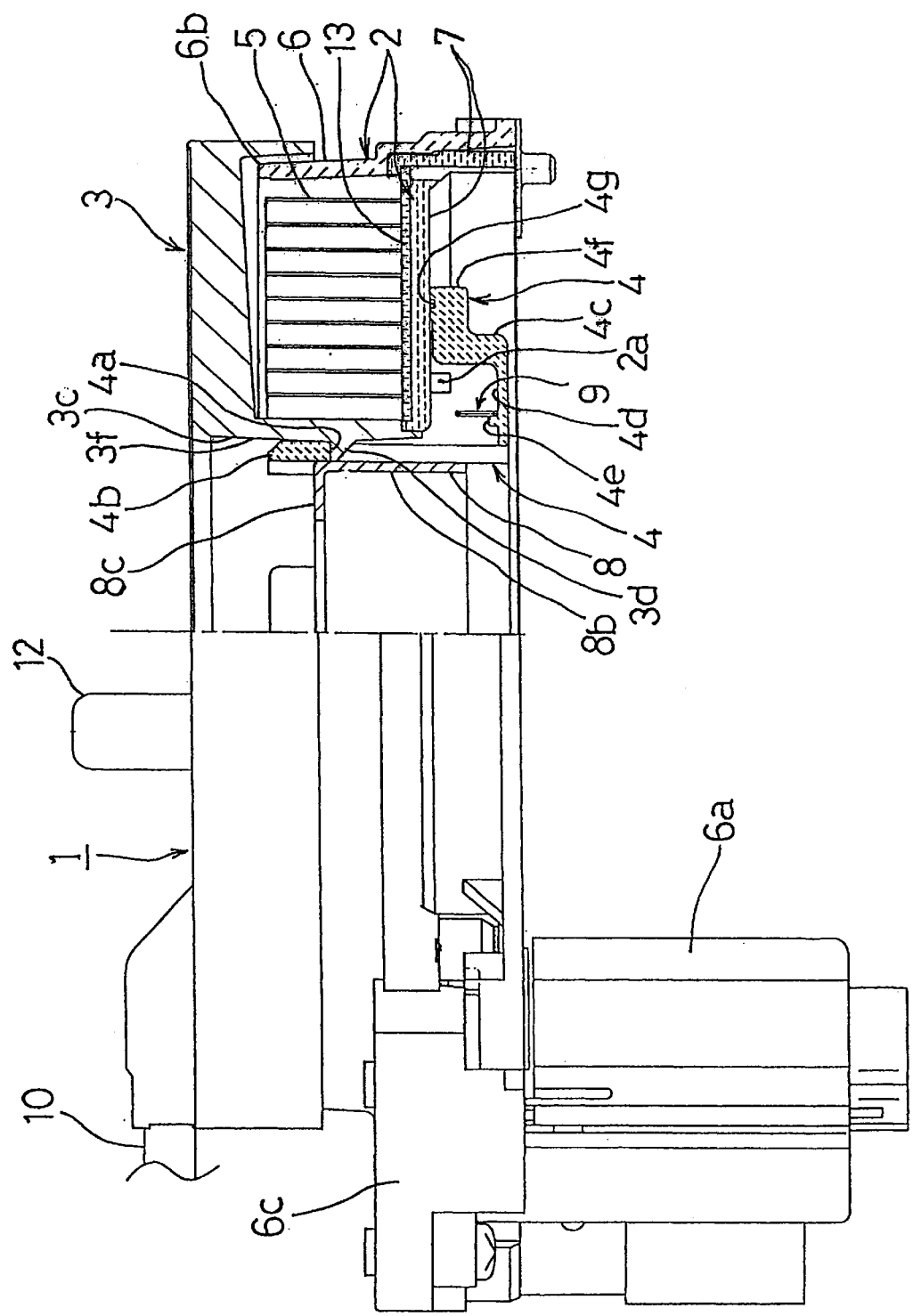
FIG. 3 is an enlarged partial cross-sectional side view of the embodiment of the invention, illustrating the steering wheel before it is mounted to the rotary connector.
Figure 4:
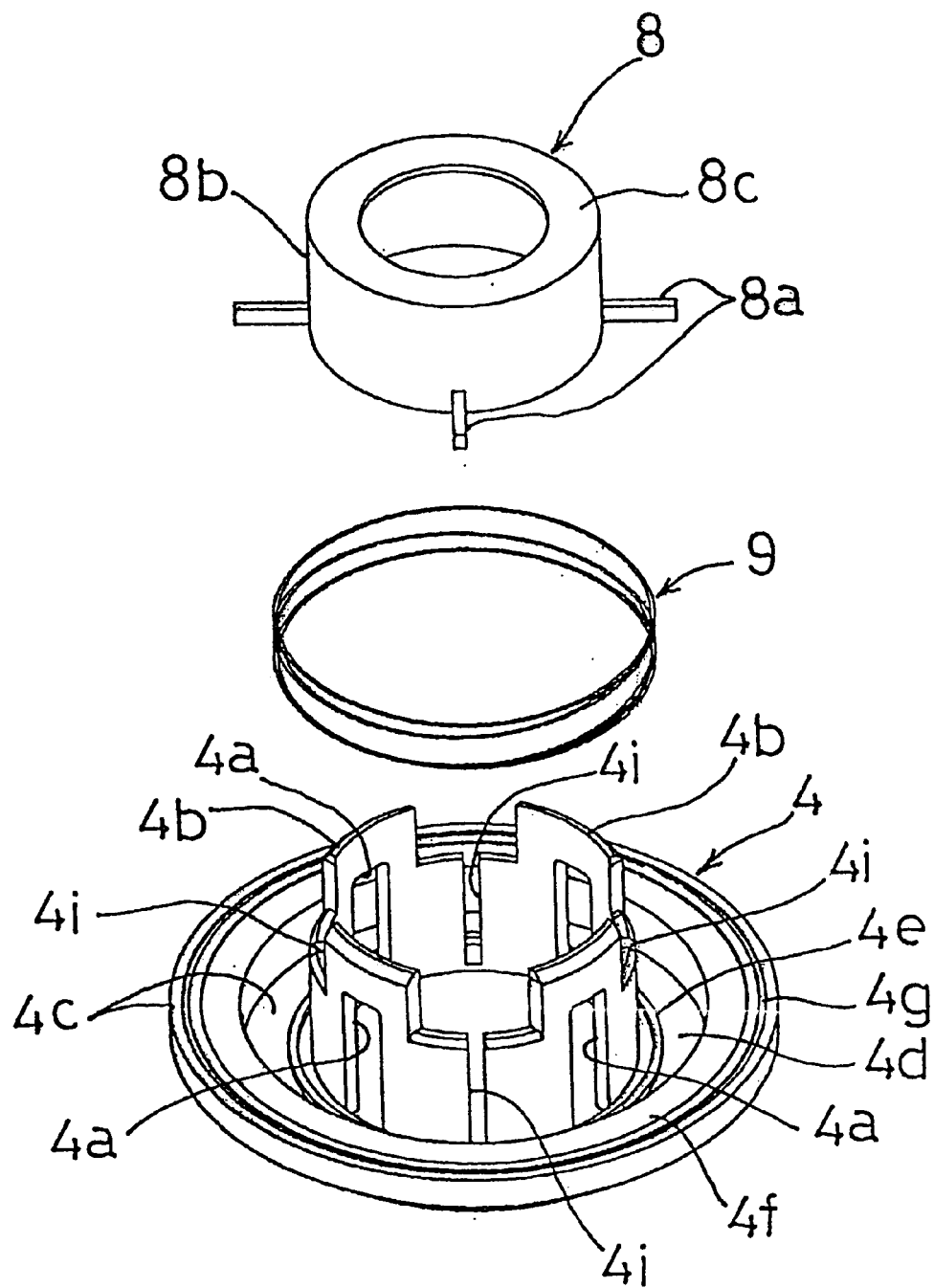
FIG. 4 illustrates the embodiment of the invention, showing an exploded perspective view of a pertinent portion.

The fitting portions 4a and upright circumferential walls 4b of the attachment 4, as shown in FIGS. 3 and 4, permit the stator housing 2 to couple with the rotor housing 3. The attachment 4 has a flange 4c at its lower circumference. That is, the attachment 4 couples with the stator housing 2 and rotor housing 3 by using a means disclosed in for example, Japanese Patent Preliminary Publication (KOKAI) No. 10-22029. The flange 4c includes an annular groove 4d that receives a spring 9 therein, an annular projection 4e formed in the annular groove 4d, and a supporting frame 4f formed to surround the annular groove 4d.

The lower end of the spring 9 is received between the annular groove 4d and the annular projection 4e such that the spring 9 is prevented from moving laterally. The frame 4f has a narrow ring-shaped groove 4g formed in the top surface 4h of the frame 4f. The top surface 4h abuts the bottom surface 2b of the stator housing 2. The ring groove 4g is a groove that holds a lubricant and a grease therein. The lubricant and grease are applied to the sliding surfaces of the rotating attachment 4 and the bottom housing 7.

Figure 2:
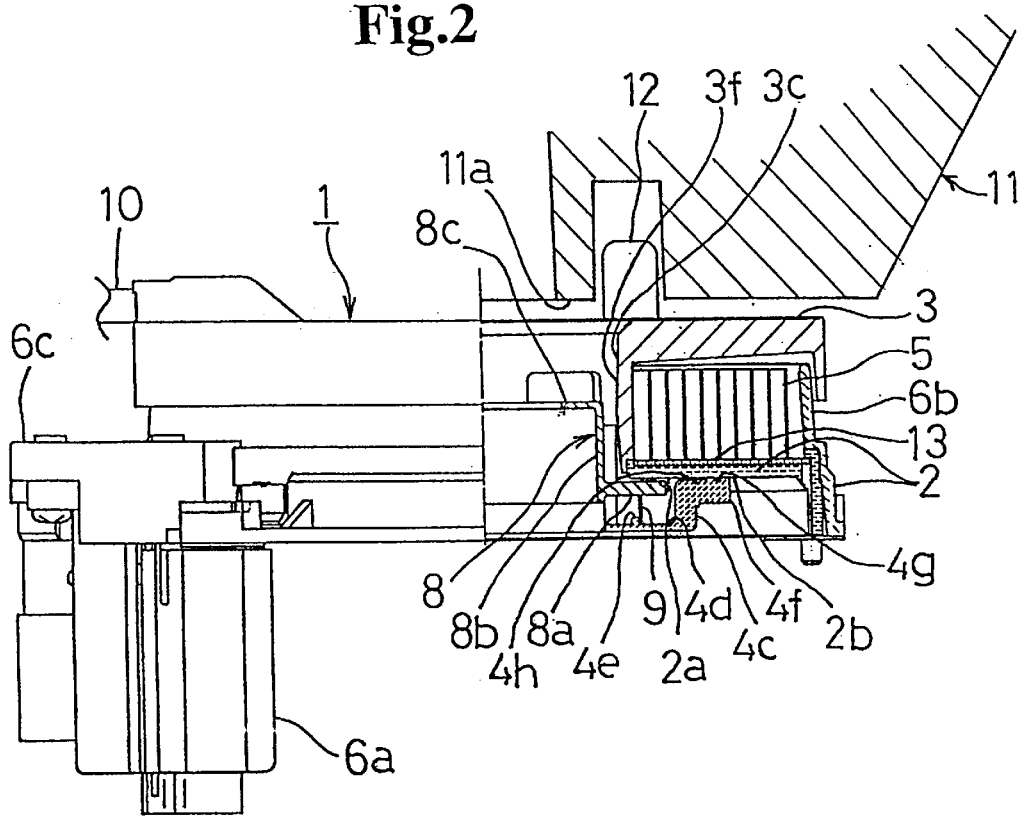
FIG. 2 is a partial cross-sectional side view of the embodiment of the invention, illustrating the steering wheel before it is mounted to the rotary connector.

As shown in FIG. 4, the spring 9 is in the form of a compressed coil spring. As shown in FIGS. 1 and 2, the lower end of the spring is received in the annular groove 4d, and the upper end of the spring 9 is in pressure contact with the projections 8a of the rotor 8.

The flat cable 5 includes, for example, a plurality of belt-shaped electrically conductive wires spaced apart by predetermined intervals, the wires being sandwiched by two sheets of insulating resin film heat-bonded to each other. The flat cable 5 has one end thereof connected to the terminals of the connector 6a of the stator housing 2, and the other end thereof connected to the wire harness 10 of the rotor housing 3.

The flat cable 5 is accommodated in the doughnut-shaped space defined by the stator housing 2 and the rotor housing 3 such that the rotor housing 3 can be rotated through more than two rotations in each of a clockwise direction and a counterclockwise direction from the neutral position at which the vehicle runs straight.

When the steering wheel 11 has not been mounted on the rotary connector 1, the rotor 8 causes the rotor housing 3 to engage the stator housing 2, thereby preventing the rotor housing 3 from rotating. The rotor 8 includes a cylinder 8b and the plurality of projections 8a. The cylinder 8b is disposed in a hollow shaft cylinder 3f of the rotor housing 3. The plurality of projections 8a are provided at the lower end of the cylinder 8b and inserted into vertical grooves 4i formed in the attachment 4.

As shown in FIG. 5, the projections 8a include four rod-like members. The projections 8a may be of any number and any shape, provided that the projections 8a can support the spring 9 and engage the engagement portions 2a.

In order to prevent fracture and the cutting-off of the projections 8a, the projections 8a may have thick base portions or ribs and may be in the shape of a tooth or wedge. The projections 8a need not be as many as the engagement portions 2a and may differ in number from the engagement portions 2a. The number of projections 8a and engagement portions 2a may be increased or the shape of them may be triangular so that when the projections 8a are engaged with the engagement portions 2a, the projections 8a and engagement portions 2a are prevented from moving laterally, thus rattling can be reduced.

Because the projections 8a enter the vertical grooves 4i such that the projections 8a are movable vertically in the vertical grooves 4i of the attachment 4, the rotor 8 rotates together with the attachment 4 and the rotor housing 3. The rotor 8 has a pressing surface 8c formed on the upper end of the cylinder 8b, the pressing surface 8c abutting the lower surface 11a of the steering wheel 11.

When the projections 8a of the rotor 8 are in the vertical grooves 4i of the attachment 4, and the steering wheel 11 has not been assembled on the rotary connector 1 yet, the spring 9 pushes up the rotor 8 so that the projections 8a engage the engagement portions 2a on the bottom surface 2b of the stator housing 2 and do not rotate is shown in FIG. 2.

When the steering wheel 11 has been assembled on the rotary connector 1, the pressing surface 8c of the rotor 8 is pressed against the lower surface 11a of the steering wheel 11 as shown in FIG. 1, so that the projections 8a are lowered while compressing the spring 9. Thus, the projections 8a are disengaged from the bottom surface 2b of the stator housing 2. The lowered projections 8a enter the annular grooves 4d as shown in FIG. 1. Due to the disengagement of the projections 8a of the rotor 8 from the stator housing 2, the rotor 8, attachment 4, and rotor housing 3 become free to rotate relative to the stator housing 2.

The operation of the embodiment of the invention of the aforementioned construction will now be described. The rotor 8 is rotatable together with the rotor housing 3 and the attachment 4 at all times. The stator housing 2 is screwed to, for example, the base of the combination switch. When the rotary connector 11 has not been mounted to the lower surface 11a of the steering wheel 11 yet, as shown in FIG. 2, the projections 8a of the rotor 8 engage the engagement portions 2a formed on the bottom surface 2b of the stator housing 2 such that the rotary connector is locked. Therefore, the rotor 8, rotor housing 3 and attachment 4 are fixed to the stator housing 2 and do not rotate.

When the steering wheel 11 is assembled on the rotary connector 1, the pressing surface 8c is pressed against the lower surface 11a of the steering wheel 11, so that the projections 8a disengage from the engagement portions 2a of the stator housing 2. Thus, the rotor 8, rotor housing 3, and attachment 4 become free to rotate relative to the stator housing 2.

When the steering wheel 11 on the rotary connector 1 is disengaged from the steering shaft, for example, for the purpose of checking or maintenance of the steering wheel 11, the steering wheel that was depressing the rotor 8 is removed, so that the spring 9 pushes up the rotor 8. Then, the projections 8a are raised to engage the engagement portions 2a of the stator housing 2, thereby preventing the rotor 8, rotor housing 3, and attachment 4 from rotating.

Therefore, even when the steering wheel 11 has not been assembled yet or the rotary connector 1 is stored as a single assembly, the rotor housing 3 may be locked in position.

The rotary connector 1 incorporates the rotor 8 that serves as a locking mechanism. Thus, when the steering wheel 11 is disassembled from the vehicle for checking and maintenance purposes, the projections 8a are allowed to engage the engagement portions 2a, thereby maintaining the positional relation between the projections 8a and the engagement portions 2a immediately before the steering wheel 11 has been disengaged from the vehicle.

When the rotary connector 1 is replaced to the vehicle, the rotor housing is not subjected to a large positional error. This prevents the rotary connector from being assembled at a non-neutral position of the steering wheel by mistake.

The present invention of the aforementioned construction provides the following advantages.

The invention is a rotary connector having a stator housing provided on a body of an automobile, a rotor housing that is rotatably assembled to the stator housing and is coupled to a steering wheel, and a flat cable that is accommodated in a space defined between the rotor housing and the stator housing. The rotor has a projection that engages the engagement portions formed on the stator housing to prevent the rotor housing from rotating.

Thus, the present invention eliminates a conventional locking member that is inserted to extend through the rotor housing and the stator housing to lock the two housings relative to each other, and is thrown away after the rotary connector has been mounted to the steering wheel. The present invention is useful because it provides easy relocking of the rotor housing and the stator housing. Further, the locking mechanism for locking the rotor housing to the stator housing remains assembled in the rotary connector. This locking mechanism prevents the rotation of the rotor housing and holds the rotor housing at a predetermined position relative to the stator housing even when the steering wheel is dismounted from the vehicle after the steering wheel has been mounted to the vehicle. The invention prevents the rotary connector from being misassembled when, for example, the checking and maintenance of the steering wheel is performed.

The invention is further defined by the rotor comprising a cylinder inserted into a shaft hollow cylinder of the rotor housing; the projection formed on a circumference of the cylinder; and a pressing surface that presses a lower surface of the steering wheel when the steering wheel has been assembled to the rotary connector. Thus, when the steering wheel is assembled to the rotary connector, the rotor is operatively lowered, so that the rotor housing is automatically unlocked.

The invention is further defined by the projection of the rotor being one of a plurality of projections that project from a lower portion of the cylinder, and the engagement portion of the stator housing is a projection that projects from a bottom surface of the stator housing. Thus, a simple structure permits the rotor housing to be engaged with and disengaged from the stator housing.

The invention is further defined by the rotor being assembled to an attachment that couples the stator housing and the rotor housing together such that the rotor housing is rotatable relative to the stator housing; wherein the attachment supports a spring that urges the rotor. This provides a simple structure that permits the rotor to lower and raise operatively when the steering wheel is mounted to and dismounted from the rotary connector.

The invention is further defined by the spring having an upper end in pressure contact with the projections, and a lower end received between an annular groove formed in the attachment and a projection formed on an inner side of the annular groove. The spring can be supported without buckling, thereby allowing the rotor to smoothly move up and down.

According to another feature of the invention, when the steering wheel has been assembled on the rotary connector and the rotor is pushed down by the steering wheel, the projections of the rotor lower into the annular groove. This structure provides a shorter vertical dimension and a thinner overall thickness of the rotary connector.

The invention is further defined by the attachment having vertical grooves into which the projections of the rotor enter such that the projections are vertically movable in the vertical grooves. This simple structure allows the rotor to be assembled such that the rotor interlocks the attachment and the rotor housing at all times.

It will be appreciated that the present invention is not limited to the exact constructions that have been described above and illustrated in the accompanying drawings, and that various modifications and changes can be made without departing from the scope and spirit of the invention. It is intended that the scope of the invention only be limited by the appended claims.

What is claimed is:

1. A rotary connector comprising:
   a stator housing provided on a body of an automobile, the stator housing being formed with an engagement portion;
   a rotor housing rotatably assembled to the stator housing and coupled to a steering wheel;
   a flat cable accommodated in a space defined between the rotor housing and the stator housing;
   a rotor having a projection that engages the engagement portion to prevent the rotor housing from rotating, wherein the rotor comprises:
     a cylinder inserted into a hollow shaft cylinder of the rotor housing;
     the projection being formed on a circumference of the cylinder; and
     a pressing surface that presses a lower surface of the steering wheel when the steering wheel has been assembled to the rotary connector;
   wherein the projection of the rotor is one of a plurality of projections that project from a lower portion of the cylinder, and the engagement portion of the stator housing is a projection that projects from a bottom surface of the stator housing;
   wherein the rotor is assembled to an attachment that couples the stator housing and the rotor housing together such that the rotor housing is rotatable relative to the stator housing; and
   wherein the attachment supports a spring that urges the rotor.

2. The rotary connector according to claim 1, wherein the attachment has vertical grooves into which the projections of the rotor enter such that the projections are vertically movable in the vertical grooves.

3. The rotary connector according to claim 1, wherein the spring has an upper end in pressure contact with the projections and a lower end received between an annular groove formed in the attachment and a projection formed on an inner side of the annular groove.

4. The rotary connector according to claim 3, wherein when the steering wheel has been assembled on the rotary connector and the rotor is pushed down by the steering wheel, the projections of the rotor lower into the annular groove.

5. The rotary connector according to claim 3, wherein the attachment has vertical grooves into which the projections of the rotor enter such that the projections are vertically movable in the vertical grooves.

6. A rotary connector for providing an electrical connection between a steering wheel and a vehicle body, the rotary connector comprising:
   a stator housing having an engagement portion that projects from a bottom surface of the stator housing;
   a rotor housing rotatably assembled to the stator housing and adapted to be coupled to the steering wheel;
   an attachment that couples the stator housing and the rotor housing together such that the rotor housing is rotatable relative to the stator housing;
   a flat cable accommodated in a space defined between the rotor housing and the stator housing; and
   a rotor having a cylinder and a projection extending outwardly from a circumference of the cylinder, said rotor being assembled to said attachment and being movable along an axis of rotation of the rotor housing between a first position in which the projection engages the engagement portion and prevents rotation of the rotor housing, and a second position in which the projection does not engage the engagement portion and allows rotation of the rotor housing.

7. The rotary connector according to claim 6, wherein the projection of the rotor is one of a plurality of projections that project from a lower portion of the cylinder.

8. The rotary connector according to claim 7, wherein the attachment supports a spring that urges the rotor.

9. The rotary connector according to claim 8, wherein the spring has an upper end in pressure contact with the projections and a lower end received between an annular groove formed in the attachment and a projection formed on an inner side of the annular groove.

10. The rotary connector according to claim 9, wherein said rotor is movable to said second position upon assembling a steering wheel on the rotary connector and pushing the rotor down by the steering wheel, whereby the projections of the rotor lower into the annular groove.

11. The rotary connector according to claim 10, wherein the attachment has vertical grooves into which the projections of the rotor enter such that the projections are vertically movable in the vertical grooves.

* * * * *